Patented Nov. 18, 1941

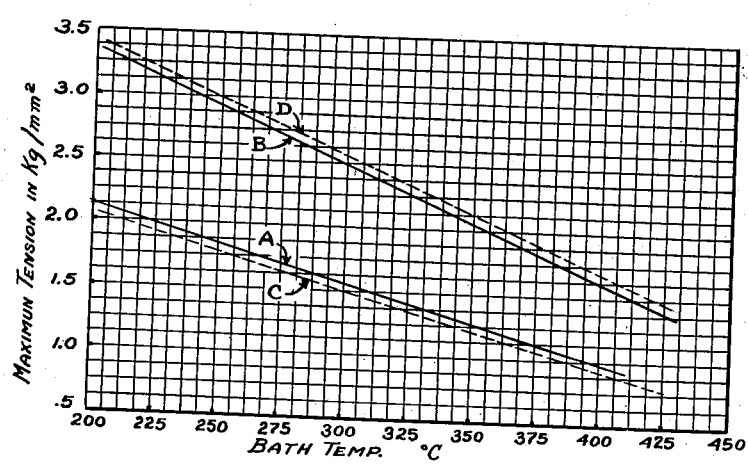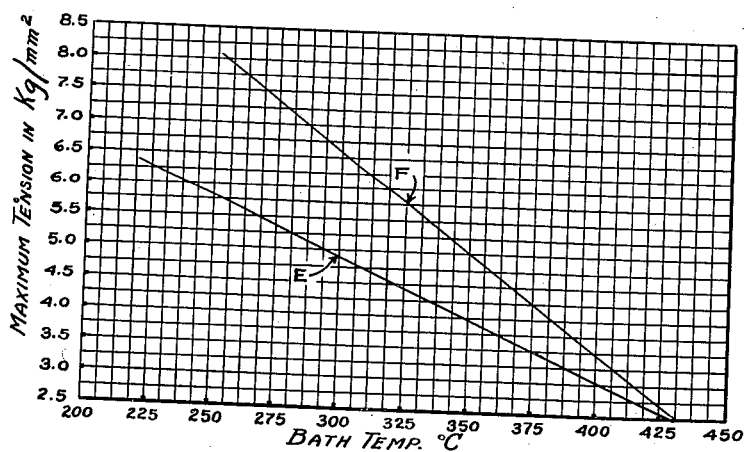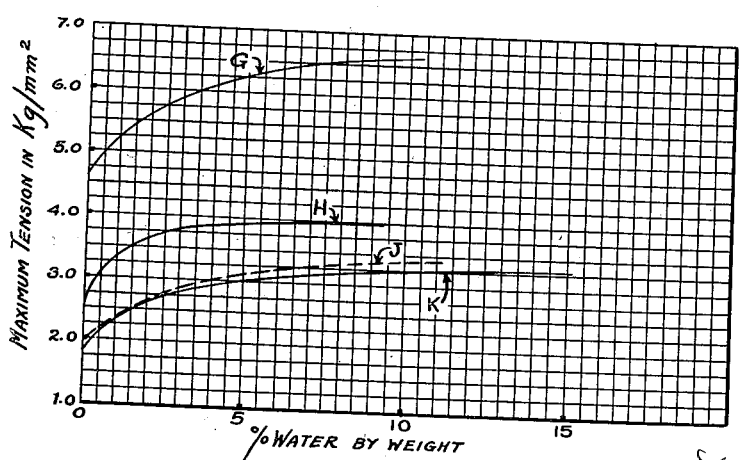

2,263,489

UNITED STATES PATENT OFFICE 2,263,489

TEMPERING BATH

Ralph K. Day, Snyder, N. Y., assignor to Corning Glass Works, Corning, N. Y., a corporation of New York Application June 22, 1938, Serial No. 215,281

4 Claims. (Cl. 49—89)

This invention relates to the tempering of glass articles and more particularly to quenching baths for use in the tempering process.

The process of tempering a glass article consists of the steps of heating the article to a temperature slightly below the softening temperature of the glass from which it is made and rapidly cooling the article to a temperature below the annealing temperature of the glass by quenching it in a cooling bath or applying jets of gas to its surface. This process sets up conditions of permanent stress in the article so that its surface layers are in compression and its interior is in tension. The amount of stress which can be set up in an article without breaking it is limited primarily by the strength of the particular glass composition, but within this limit the strength of the tempered article increases with the degree of stress therein. It has been found that the faster heat is removed from a given article the greater will be the degree of stress set up.

A considerable number of substances have been used as quenching baths in the glass tempering process. Most common of these are the oils, molten metals and salts and synthetic materials such as the light chlorinated resins. From the commercial standpoints of cost, durability, and ease of control and manipulation the molten salts, singly and in combination, have proved most satisfactory. However, due to the natural characteristics of these materials such as their specific heats and melting points, the rate at which they will remove heat from a hot glass article is definitely limited. With many glass compositions this limitation does not interfere with the production of the maximum desired temper, but in the case of low expansion glasses it has been impossible to secure the maximum desired degree of stress using molten salts alone or as eutectic compositions.

The object of this invention is a quenching bath for use in the process of glass tempering composed primarily of molten salt or salts capable of exerting a more severe chilling action than the molten salts alone. A further object of the invention is a quenching bath composed primarily of molten salt or salts and having a longer working range than the range of its component parts.

These and other objects result from the practice of this invention which features the incorporation of a small amount of water in a bath of molten salt or salts and the continuous introduction of water in sufficient volume to maintain the percentage of water in the bath relatively constant.

While water alone has been used as a quenching bath in the production of highly stressed Prince Rupert's drops, it is such a severe chilling medium that attempts to use it in the tempering of shaped commercial articles have always resulted in the destruction of the articles. In the present instance it has been found that a small amount of water may be added to molten salts such as the nitrates, nitrites, chlorides, and sulphates of barium, calcium, sodium, and potassium producing baths which have markedly superior chilling ability to the molten salts alone. Such baths are relatively stable below 300° C. and may be used over a range of temperatures depending on the composition of the salts, of from 105° C. to 550° C.

The manner in which water is retained in molten salts at temperatures above 100° C. is not fully understood, but it has been determined experimentally that when small quantities of water are added to molten salts such as a potassium nitrate-sodium nitrate eutectic some twenty-four hours heating at 300° C. are required to bring the salts to equilibrium conditions at which no further water is driven off. At 400° C. this time is reduced to some three or four hours, while at 500° C. one hour is sufficient. Accordingly, it will be seen that for quenching baths operating at from 100° C. to about 550° C., small percentages of water can be maintained in a molten salt bath with relative ease, only enough water being introduced, continuously or from time to time, to make up the water being driven off at that particular operating temperature. This water may be introduced either as a liquid or as steam, steam being preferable at temperatures above 400 C.

The effect of adding water to molten salt solutions will vary according to the particular salt or salts which compose the remainder of the bath and the operating temperature thereof. While it is difficult to generalize under such conditions as to the results obtained, it may be stated that the chilling power of a bath held at a constant temperature does not increase directly with the amount of water introduced, but reaches substantially its maximum value with about 15% of water. A second generalization which holds true is that the percentage increase in chilling power of a bath due to the addition of a given percentage of water decreases as the operating temperature of the bath increases. Thus, the greatest benefits are obtained by the addition of small percentages of water to baths operated at the lower temperatures.

By way of illustration three curves are presented showing the results obtained in actual operation under specific circumstances. Since the value of maximum tension set in a piece of glass is a measure of the chilling power of a bath, the effect of the addition of water to the salt baths in question is shown in values of tension produced.

In preparing the data from which the curves of Fig. 1 were plotted, slabs of borosilicate glass of the composition $B_2$ of the Sullivan and Taylor Patent No. 1,304,623 2" x 4" x ¼" were preheated at 450° C. heated at 900° C. for one and one-half minutes and immediately quenched in salt baths of the desired composition, temperature and water content. The solid curves A and B were obtained with a salt composition of 80% ($KNO_3+NaNO_3$ eutectic) and 20% Ba $(NO_3)_2$, 5% water being added in the case of curve B. Curves C and D were obtained by quenching similar slabs similarly heated in a salt bath composed of 45% $KNO_3$+20% $NaNO_3$+35% $Ca(NO_3)_2$ 5% water being added in the case of curve D.

Fig. 2 represents the results obtained by preheating 2" x 4" x ¼" slabs of Libbey-Owens-Ford plate glass at 400° C., heating for thirty seconds at 800° C. and quenching in a bath composed of 80% ($KNO_3+NaNO_3$ eutectic) and 20% $Ba(NO_3)_2$. Curve E indicates the results obtained with a water free salt bath while curve F indicates results with 5% of water added to the salt bath.

Fig. 3 shows the results obtained by adding increasing percentages of water to salt baths held at uniform temperatures. Curve G indicates the results obtained by quenching slabs of Libbey-Owens-Ford plate glass heated as above in a ($KNO_3+NaNO_3$) +$Ba(NO_3)_2$ bath held at 300° C. Curves H, J, and K show the results obtained by quenching slabs of borosilicate glass, preheated as described above, in salt baths of various compositions and temperatures. The bath of curve H as $KNO_3+NaNO_3$ eutectic held at 225° C.; that of curve J was ($KNO_3+NaNO_3$) +$Ca(NO_3)_2$ held at 225° C.; that of curve K was ($KNO_3+NaNO_3$) +$Ba(NO_3)_2$ held at 250° C. The results with a mixture of 66.6% $NaNO_3$ and 33% $Ca(NO_3)_2$ were substantially identical with those of curve J and are not plotted.

Not only has it been found that the addition of small quantities of water materially increases the chilling power of molten salt baths, but it has also been found that these salt baths have been made effective for use over a wider temperature range. Thus, when 5% of water is added to the eutectic mixture of $KNO_3$ and $NaNO_2$ the water apparently goes into solution in the salt lowering its melting point and providing a working range down to 105° C. some 35° C. below the normal melting point of the eutectic. In the case of the $KNO_3+NaNO_3$ eutectic this effect is not quite so pronounced but lowers the minimum working temperature from 220° C. to 190° C. Similar effects are noted with the other substances used.

While the results obtained by the addition of small quantities of water to various specific salts and salt baths have been set forth in detail these results have been shown by way of illustration and not of limitation and the scope of the invention is to be limited solely by the terms of the following claims.

I claim:

1. The method of tempering a glass article which comprises heating the article to a temperature approaching the softening temperature of the glass from which it is made and quenching the hot article in a bath of molten salt selected from the group consisting of the nitrates, nitrites, chlorides, and sulphates of barium, calcium, sodium, and potassium maintained at a temperature above its melting temperature, and maintaining a small, regulable quantity of water in said bath during said quenching operation.

2. The method of tempering a glass article which comprises heating the article to a temperature approaching the softening temperature of the glass from which it is made and quenching the hot article in a liquid mixture containing water and an inorganic salt selected from the group consisting of the nitrates, nitrites, chlorides, and sulphates of barium, calcium, sodium, and potassium maintained at a temperature of from 105° C. to 550° C., and adding sufficient water to said mixture during the quenching operation to maintain its water content substantially constant.

3. The method of tempering a glass article which comprises heating the article to a temperature approaching the softening temperature of the glass from which it is made and quenching the hot article in a liquid mixture of salts selected from the group consisting of the nitrates, nitrites, chlorides, and sulphates of barium, calcium, sodium, and potassium containing appreciable amounts of water and maintained at a temperature above the melting point of the salts, and periodically adding sufficient water to said mixture to maintain its water content substantially constant.

4. The method of tempering a glass article which comprises heating the article to a temperature approaching the softening temperature of the glass from which it is made and quenching the hot article in a liquid mixture of salts selected from the group consisting of the nitrates, nitrites, chlorides, and sulphates of barium, calcium, sodium, and potassium containing from 1 to 15% by weight of water and maintained at a temperature above the melting point of the salts, and maintaining said water content substantially constant during the quenching operation by the addition of make-up water.

RALPH K. DAY.